Sept. 27, 1932. E. K. COLE 1,879,636
CABLE END TAKE-UP FITTING
Filed Aug. 31, 1931
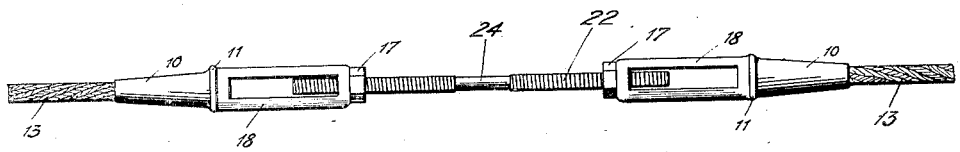
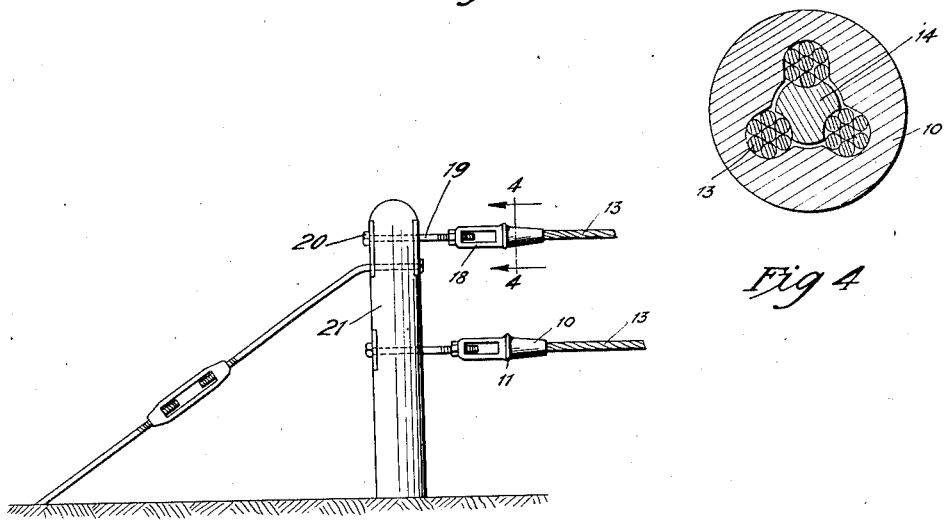
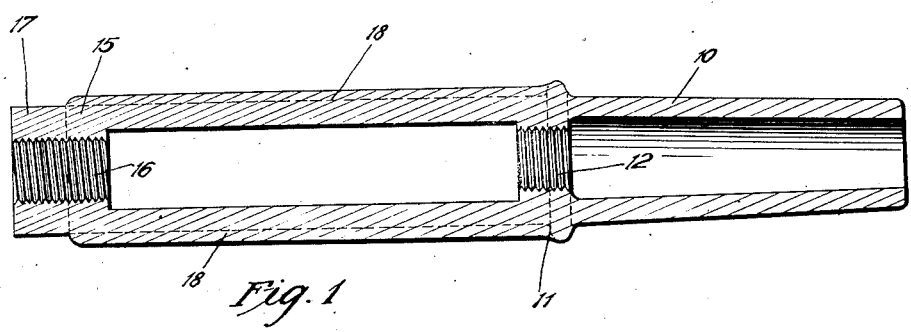
Inventor
Elmer K. Cole
by Ornig & Hague Attys.

Patented Sept. 27, 1932

1,879,636

UNITED STATES PATENT OFFICE

ELMER K. COLE, OF WINTERSET, IOWA

CABLE END TAKE-UP FITTING

Application filed August 31, 1931. Serial No. 560,457.

The object of my invention is to provide a cable end take-up fitting of simple, durable and inexpensive construction, especially adapted for use in connection with highway guard rails and the like.

More specifically it is my object to provide a fitting of this character in which there is combined a cable end locking portion designed to receive a cable end and also to receive a cable end locking device, with a cable end take-up head designed to receive a screw threaded take-up rod, and whereby the rod may be passed through a post or other support and rotated to thereby move the take-up fitting toward the post to take up slack and leave the head of the take-up rod flush with the side of the post at all times.

My invention consists in the construction, arrangement and combination of the various parts of the device, whereby the objects contemplated are attained, as hereinafter more fully set forth, pointed out in my claim, and illustrated in the accompanying drawing, in which:

Figure 1 shows a longitudinal sectional view of a cable end take-up fitting.

Figure 2 shows a side elevation of two of my improved cable end take-up fittings with cables attached thereto and the single take-up rod inserted in the take-up heads of both fittings to serve as a combined cable splice and take-up fitting.

Figure 3 shows a side elevation of a post with two of my improved take-up fittings attached to cables and connected to the post by means of screw threaded bolts passed through the post and into the take-up heads; and Figure 4 shows a transverse sectional view through the line 4—4 of Figure 3 to illustrate the cable locking device.

Referring to the accompanying drawing, I have used the reference numeral 10 to indicate the body portion of the cable end locking member. It is of cylindrical form and tapered toward one end and provided at the other end with a head 11 having an opening 12 therein, which opening is preferably screw threaded as shown. A cable 13 is inserted in the small end of the body 10 and then a wedge 14 is inserted through the opening 12 and driven between the strands of the cable to form a cable locking means.

In some instances it may be desirable to provide a means for forcing the wedge into the cable strands, and if this is to be done, a screw threaded rod may be inserted through the screw threaded portion of the opening 12 and turned to force the wedge into the cable. In some instances, however, it is not necessary to use this wedge engaging screw threaded rod.

The cable take-up head is indicated generally by the reference numeral 15 and is provided with a screw threaded opening 16 in line with the opening 12, and has a nut shaped outer end 17 designed to receive a wrench. The head 15 is connected with the body 11 by means of two arms 18 spaced apart from each other and rigidly connected both to the head 17 and the head 11. The length of these arms is equal to the amount which it is desired to take up slack in the cable. The spaces between the arms are provided to receive a tool, such for instance as a crowbar, so the operator may insert the tool and easily and conveniently prevent rotation of the fitting.

Mounted in the screw threaded opening 16 is a bolt 19 having a nut shaped head 20 to receive a wrench. This bolt may be passed through a post 21 and then through the screw threaded portion of the take-up head 15, and then the head 20 of the bolt may be turned with a wrench, and the fitting thereby moved toward the post. During all of this operation the head 20 of the bolt is flush with the side of the post, so that after the slack in the cable is taken up, the head of the bolt will be flush with the side of the post.

Where the device is used as a cable splice and take-up device, a screw threaded rod 22 is provided as shown in Figure 2, and this rod has a squared central portion 24 and its ends are screw threaded in opposite directions, and by applying a wrench to the part 24 and turning the rod, both of the fittings are turned toward each other and slack in the cable taken up.

In practical operation with my improved fitting a number of advantages and economies are obtained over devices now in general use.

In my Patent Number 1,694,683, issued December 11, 1928, there was illustrated and described a cable end take-up device in which the screw threaded rod, which held the wedge in position, was projected through a post and a nut on the rod engaged the post and provided for taking up slack in the cable by turning said nut. However, with this construction, the end of the bolt projected beyond the post and for that reason was objectionable.

Furthermore, in said patent there was illustrated a cable splice which to some extent was for the same purpose as that shown in Figure 2 of this application. However, with this cable splice there was no means provided for taking up slack, whereas with my present device the cable splice performs the double function of a cable splice and slack take-up.

With my improved device all of these advantages are attained with a single fitting member which requires no more work to construct than the cable end locking device illustrated in my said patent. Hence, considerable economy is thereby effected.

I claim as my invention:

A combined cable end lock and take-up fitting comprising a body portion having spaced end portions and spaced parallel arms integrally connected with and joining the same, and a cable receiving socket extending from one end portion, the said end portions being formed with axially aligned openings of which the one adjacent the socket is provided for the passage of cable securing means and the other adapted to receive anchoring means.

Des Moines, Iowa, August 26, 1931.

ELMER K. COLE.